R. E. HELLMUND.
SYSTEM OF CONTROL.
APPLICATION FILED JAN. 6, 1917.
1,320,054.
Patented Oct. 28, 1919.
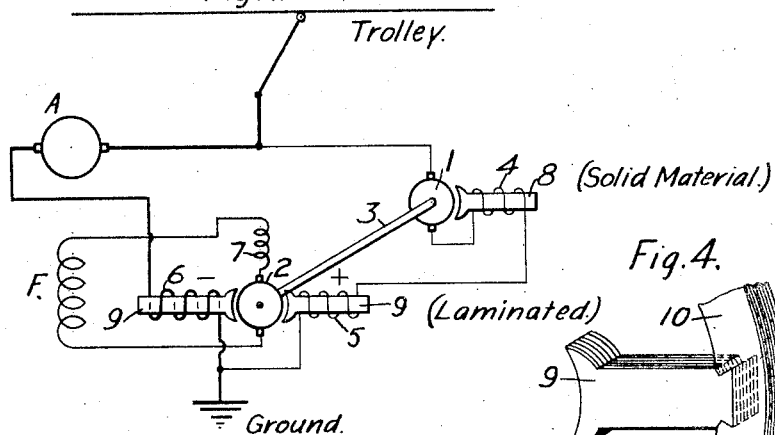
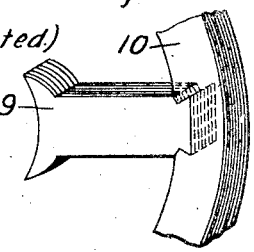
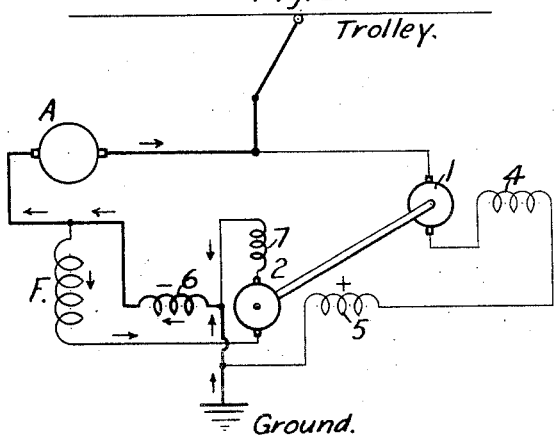
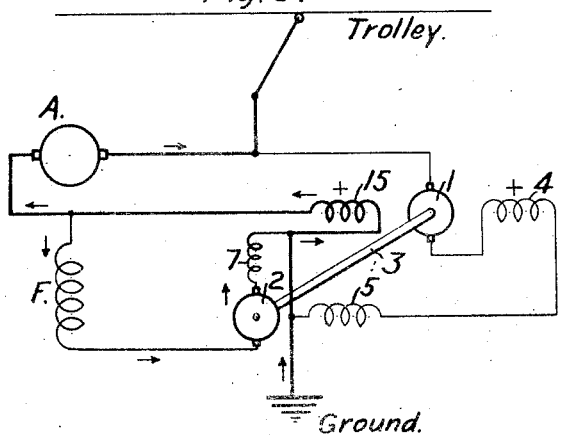
WITNESSES:
Ed Plinke.
W. R. Coley
INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,320,054. Specification of Letters Patent. Patented Oct. 28, 1919.

Application filed January 6, 1917. Serial No. 140,931.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the regenerative control of momentum-driven electric-railway vehicle motors and the like.

The object of my invention is to provide a regenerative-control system of the type employing an auxiliary motor-generator set for the purpose of supplying an exciting current to the main-machine field winding during the regenerative period, wherein the response of the motor-generator set to variations in the electrical conditions of the system, and particularly with respect to the unavoidable supply-circuit-voltage fluctuations, shall be relatively rapid, whereby a substantially constant regenerated current is inherently maintained, and voltage peaks, tending to produce "flash-over" conditions in the main or auxiliary machine are obviated.

In another aspect, it is the object of my invention to provide a relatively simple and reliable regenerative control system of the above-indicated character, whereby one of the auxiliary-machine field windings is so connected in circuit that it is also capable of imparting to the system a "negative compound characteristic," that is, an incipient increase of regenerated current is inherently and rapidly counteracted by a corresponding decrease of main-field-winding excitation, and vice versa.

My invention may best be understood by reference to the accompanying drawing, wherein Figure 1 is a simplified diagrammatic view of a regenerative-control system embodying my present invention; Fig. 2 and Fig. 3 are similar views of modified systems for performing the desired functions; and Fig. 4 is a fragmentary perspective view, illustrating the preferred construction of the field-winding magnetic circuit of the auxiliary exciting machine that is employed in the present invention.

Referring to Fig. 1 of the drawing, the system shown comprises suitable supply-circuit conductors, respectively marked Trolley and Ground; a dynamo-electric machine having an armature A and a field winding F of the familiar series type; and an auxiliary motor-generator set for performing certain functions, to be described, during the regenerative operation of the main machine.

The motor-generator set is shown as comprising a driving or motor armature 1 that is mechanically associated with an exciting or generator armature 2 by means of a shaft 3, for example; field windings 4 and 5 for the respective armatures 1 and 2 that are connected in series relation with the auxiliary motor armature 1 across the supply circuit; a second field winding 6 for the auxiliary exciting armature 2 that is energized in accordance with the current traversing the main armature A and is differentially disposed with respect to the corresponding first-mentioned auxiliary field winding 5, as indicated by the plus and minus signs. A suitable compensating field winding 7 for reducing the effects of armature self-induction, in accordance with familiar principles, is preferably connected in series relation with the auxiliary generating armature 2 across the main field winding F which, in the present system, has no other electrical connection to the regenerative system.

The entire field-winding magnetic circuit for the auxiliary motor armature 1 is composed of solid magnetic material for the purpose of rendering the response of the auxiliary motor relatively sluggish, particularly with respect to supply-circuit-voltage fluctuations, while the field-winding magnetic circuit for the auxiliary exciting armature 2 is preferably entirely laminated to thus effect a relatively rapid variation of electrical conditions in the armature, in accordance with such supply-circuit voltage fluctuations. In other words, the motor field winding 4 may be termed "damped," while the generator field winding 5 may be considered as "undamped."

The structural features just enumerated are indicated in the drawing by a polar projection 8 and the legend "Solid material" that is associated with the auxiliary motor field winding 4, and the polar projection 9, which is shown in the enlarged view of Fig. 4, in connection with a yoke 10. The type of magnetic circuit that is represented by the reference characters 9 and 10 is associated with each of the field windings 5 and 6 for the auxiliary exciting armature 2. Although, in the following figures, the laminated structures 9 and 10 are not directly illustrated, I desire it to be understood that such structures are preferably employed in connection with the auxiliary generator field windings 5, while the auxiliary-motor field windings 4 are provided with the solid field-magnet structure above referred to.

Assuming that the circuit connections are as illustrated, and that regenerative operation has been effected in any well-known manner which need not be described in the present application, the action of the system with respect to supply-circuit-voltage fluctuations may be described as follows: In the case of a sudden decrease of supply-circuit-voltage, for example, the counter-electromotive force of the auxiliary motor armature 1 will retain its former value for a certain period of time, by reason of the above-mentioned construction of the field-winding magnetic circuit thereof and the consequent sluggish action of the motor. As a result, the decreased difference between such counter-electromotive force and the reduced supply-circuit-voltage will cause a correspondingly decreased current to flow through the auxiliary field windings 4 and 5. Such effect, in turn, will produce a relatively rapid reduction of the voltage delivered by the auxiliary exciting armature 2, by reason of the above-mentioned laminated construction and the resultant quick response of the machine in question to variations of circuit conditions. Thus, the excitation of the main field winding F is correspondingly reduced to inherently and rapidly prevent the regenerated current traversing the main armature A, from varying, in this case, increasing, to any considerable degree, which the regenerated current tends to do whenever the supply-circuit voltage is decreased, as is well known.

The converse effect is, of course, produced in the case of an increase of supply-circuit voltage or a decrease of regenerated current. A further inherent regulating effect is produced by the joint action of the differentially related field windings 5 and 6 for the exciting armature 2, since an increase of regenerated current traversing the field winding 6 correspondingly reduces the effective field flux threading the auxiliary armature, with a consequent reduction of the voltage delivered thereby, as will be understood.

Thus, an exceedingly rapid inherent variation of the main field-winding excitation for counteracting incipient changes in regenerated current or compensating for supply-circuit-voltage fluctuations is produced.

Referring now to Fig. 2, the system shown comprises circuit connections similar to those shown in Fig. 1, with the following exceptions: The main field winding F is connected in circuit with the auxiliary field winding 6 for the exciting armature 2 in such manner that the field winding carries, in the same direction, the combined currents of both the main armature A and the main field winding F, as indicated by the arrows.

The main regenerative circuit is thus established from ground through the auxiliary field winding 6 and the main armature A to the trolley, while the main field-winding circuit is established from one terminal of the exciting armature 2 through the auxiliary field windings 7 and 6 and the main field winding F to the other terminal of the exciting armature 2. The result of such connection of the auxiliary field winding 6 is that, in addition to furnishing excitation for the generator armature 2, in differential relation to the auxiliary field winding 5 for the previously described purpose, the auxiliary field winding 6 also performs the function of imparting the above-defined "negative compound characteristic" to the system, which is accomplished as follows: Assuming an incipient increase of regenerated current, the voltage drop across the auxiliary field winding 6 is immediately increased to a corresponding degree, whereby the value of voltage that is delivered to the main field winding F from the temporarily constant-voltage exciting armature 2 is, of course, accordingly reduced. Thus, an increase of regenerated current inherently effects a decrease of main field-winding excitation, and the converse effect also occurs.

By reason of the above-recited arrangement of field winding magnetic circuits for the auxiliary motor and the auxiliary generator, the previously described actions of the motor-generator set, upon fluctuations of supply-circuit voltage, also take place in connection with the present system, in addition to the "negative compound action" that has just been set forth. A further desirable effect, of temporary duration, is produced by the self-inductive action of the auxiliary field winding 6 which thus tends to cause a greater instantaneous reduction of the main field-winding voltage than obtains when the system has become fully readjusted to the new value of supply-circuit-voltage.

In Fig. 3, the only difference in connection from the system that is shown in Fig. 2 resides in the elimination of the auxiliary field winding 6 and the employment of an additional field winding 15 for the auxiliary motor armature 1 that is cumulatively related to the corresponding series-excited field winding 4.

Under the previously assumed conditions of a certain decrease of supply-circuit voltage and the consequent tendency of the regenerated current to correspondingly increase, the auxiliary field winding 15 for the motor armature 1 will effect a corresponding increase of the field flux threading the auxiliary armature in question. Thus, the counter-electromotive force of the armature 1 will not only temporarily remain relatively high, by reason of the previously described sluggish action of the auxiliary motor, but such counter-electromotive force will be further increased through the action of the auxiliary field winding 15. In this way, the current traversing the auxiliary field windings 4 and 5 is rapidly and materially reduced to correspondingly decrease the delivered voltage of the exciting armature 2, and, therefore, the voltage impressed upon the main field winding F.

In addition to such action, the previously recited "negative compound" effect will also be imparted to the present system by reason of the peculiar circuit connection of the auxiliary field winding 15, which occupies the same relative circuit position as the above described auxiliary generator-field winding 6 of Fig. 2. Furthermore, the self-inductive effect of the auxiliary winding 15 will again produce the temporary effect that was described in connection with the auxiliary field winding 6. The entire regulating action of the motor-generator set is rendered more rapidly effective by reason of the previously described structural features.

By employing the above-described systems, an inherent counteracting effect for variations of supply-circuit voltage or regenerated current is produced at a more rapid rate than has been possible through the use of any prior systems of this general type of which I am aware.

I do not wish to be restricted to the specific circuit connections or arrangements of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a supply circuit and a dynamo-electric machine having an armature and a field winding, of an auxiliary motor-generator set having its armatures respectively driven from the supply circuit and employed to excite said field winding and also having its armatures respectively provided with "damped" and "undamped" field windings that are excited in accordance with the current traversing the auxiliary motor armature, and additional inductive means for preventing relatively large variations of main machine current.

2. In a system of control, the combination with a supply circuit and a dynamo-electric machine having an armature and a field winding, of an auxiliary motor-generator set having its armatures respectively driven from the supply circuit and employed to excite said field winding and also having its armatures provided with field windings that are excited in accordance with the current traversing the auxiliary motor armature, and additional inductive means for preventing relatively large variations of main-machine current, the auxiliary motor field winding being adapted for relatively sluggish response to variations of supply circuit conditions and the auxiliary generator field winding being adapted for relatively rapid response to such variations.

3. In a system of control, the combination with a supply circuit and a dynamo-electric machine having an armature and a field winding, of an auxiliary motor-generator set having its armatures respectively driven from the supply circuit and employed to excite said field winding and also having its armatures provided with field windings that are excited in accordance with the current traversing the auxiliary motor armature, the auxiliary-motor field-winding magnetic circuit being chiefly of solid material and the auxiliary-generator field-winding magnetic circuit being entirely laminated, and an additional field winding for one of the auxiliary armatures to further counteract relatively large variations of main-machine current.

4. In a system of control, the combination with a supply circuit and a dynamo-electric machine having an armature and a field winding, of an auxiliary motor-generator set having its armatures respectively driven from the supply circuit and employed to excite said field winding and also having its armatures provided with field windings that are excited in accordance with the current traversing the auxiliary motor armature, and an additional auxiliary field winding connected to coöperate with one of the armatures of the motor-generator set to impart to the system a "negative compound characteristic".

5. In a system of control, the combination with a supply circuit and a dynamo-electric machine having an armature and a field winding, of an auxiliary motor-generator set having its armatures respectively driven from the supply circuit and employed to excite said field winding and also having its armatures provided with field windings that are excited in accordance with the current traversing the auxiliary motor armature, and an additional field winding for the auxiliary generator differentially disposed with respect to the corresponding first-mentioned auxiliary field winding and also connected to coöperate with one of the armatures of the motor-generator set to impart to the system a "negative compound characteristic".

6. In a system of control, the combination with a supply circuit and a dynamo-electric machine having an armature and a field winding, of an auxiliary motor-generator set having its armatures respectively driven from the supply circuit and employed to excite said field winding and also having both its armatures provided with field windings that are excited in accordance with the current traversing the auxiliary motor armature, and additional inductive means energized in accordance with the combined main-armature and main-field-winding currents for preventing relatively large variations of main-machine current.

7. In a system of control, the combination with a supply circuit and a dynamo-electric machine having an armature and a field winding, of an auxiliary motor-generator set having its armatures respectively driven from the supply circuit and employed to excite said field winding and also having both its armatures provided with field windings that are excited in accordance with the current traversing the auxiliary motor armature, and an additional field winding for one of the auxiliary armatures that is continually energized in accordance with the combined main-armature and main-field-winding currents.

8. In a system of control, the combination with a supply circuit and a dynamo-electric machine having an armature and a field winding, of an auxiliary motor-generator set having its armatures respectively driven from the supply circuit and employed to excite said field winding and also having both its armatures provided with field windings that are excited in accordance with the current traversing the auxiliary motor armature, and an additional field winding for the exciting armature that is energized in accordance with the combined main-armature and main-field-winding currents and is differentially disposed with respect to the corresponding first-mentioned auxiliary field winding.

9. In a system of control, the combination with a supply circuit and a dynamo-electric machine having an armature and a field winding, of an auxiliary motor-generator set having its armatures respectively driven from the supply circuit and employed to excite said field winding and also having both its armatures provided with field windings that are excited in accordance with the current traversing the auxiliary motor armature, and an additional field winding for the exciting armature that is energized in accordance with the combined main-armature and main-field-winding currents and is differentially disposed with respect to the corresponding first-mentioned auxiliary field winding, the auxiliary-motor field-winding magnetic circuit being chiefly of solid material and the auxiliary-generator field-winding magnetic circuit being entirely laminated.

10. In a system of regenerative control, the combination with a supply circuit and a dynamo-electric machine having an armature and a field winding, of an auxiliary motor-generator set having its armatures respectively driven from the supply circuit and employed in an independent circuit with the main field winding and also having both its armatures provided with field windings that are excited in accordance with the current traversing the auxiliary motor armature, and an additional field winding for the auxiliary generator energized in accordance with the main-armature current, the auxiliary-motor field-winding magnetic circuit being chiefly of solid material and the auxiliary-generator field-winding magnetic circuit being entirely laminated.

11. In a system of control, the combination with a supply circuit and a dynamo-electric machine having an armature and a field winding, of an auxiliary motor-generator set for exciting the main field winding and comprising a field winding for one of the auxiliary armatures that is continually energized in accordance with the combined main-armature and main-field winding currents.

In testimony whereof, I have hereunto subscribed my name this 30th day of Dec. 1916.

RUDOLF E. HELLMUND.